W. E. & R. H. TRICE.
CULTIVATOR.
APPLICATION FILED DEC. 29, 1906.
915,509.
Patented Mar. 16, 1909.
2 SHEETS—SHEET 1.
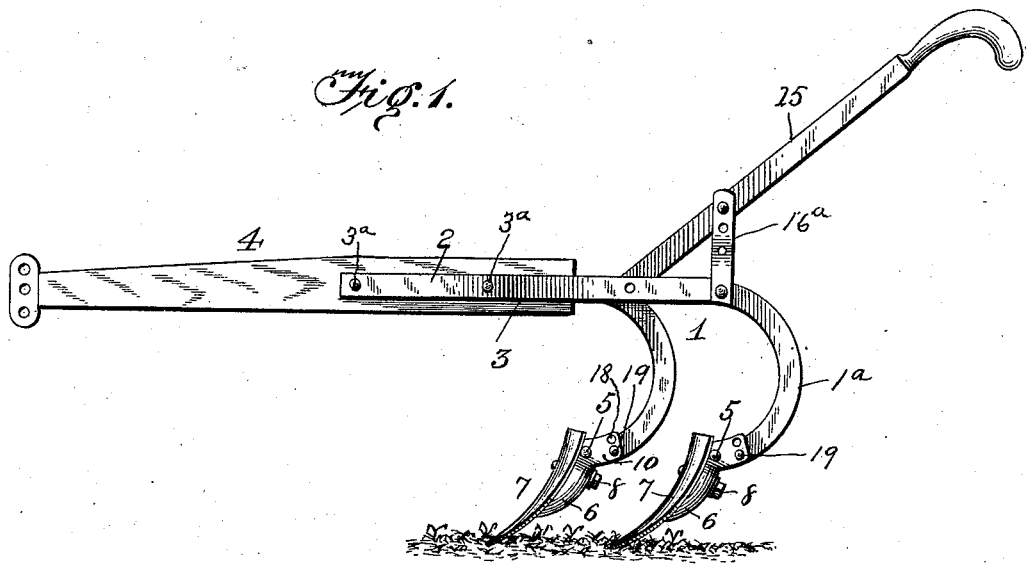
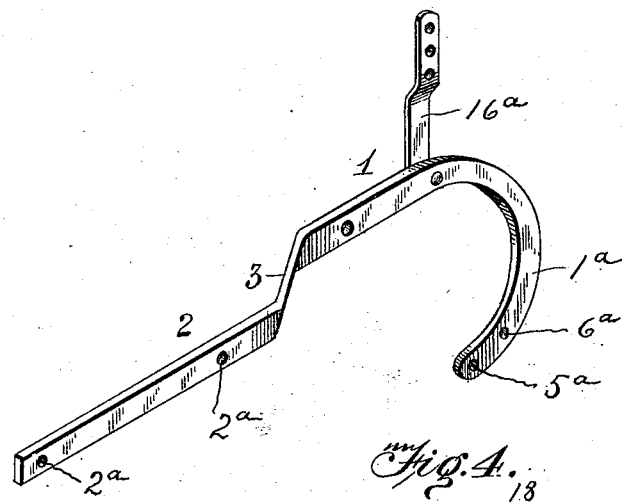
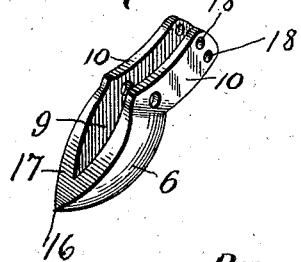
Witnesses:
Inventors:
Wm E. Trice
Robert H. Trice
By
Attys.

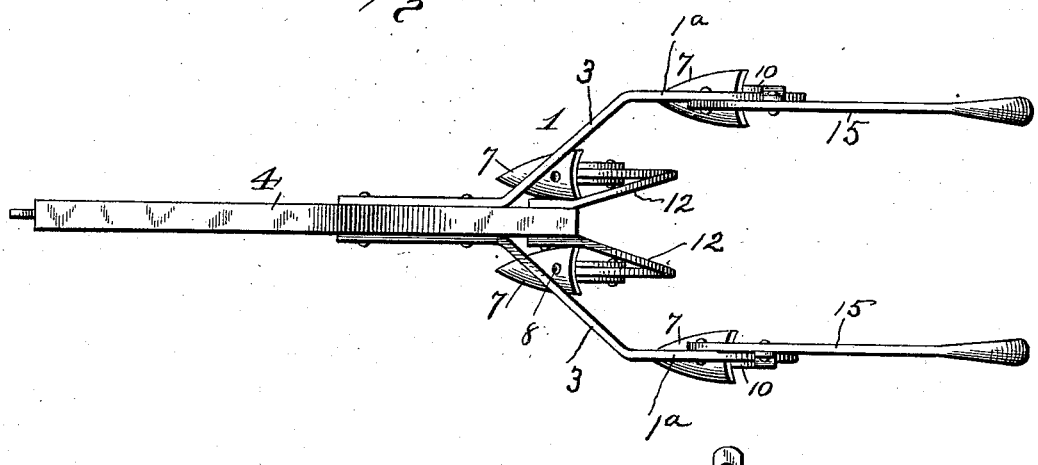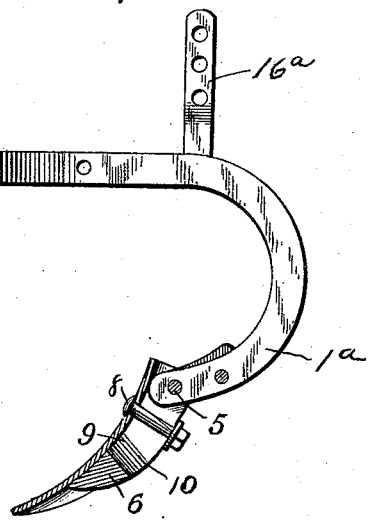

UNITED STATES PATENT OFFICE.

WILLIAM E. TRICE AND ROBERT H. TRICE, OF LEBANON, TENNESSEE.

CULTIVATOR.

No. 915,509.  Specification of Letters Patent.  Patented March 16, 1909.

Application filed December 29, 1906. Serial No. 350,077.

*To all whom it may concern:*

Be it known that we, WILLIAM E. TRICE and ROBERT H. TRICE, citizens of the United States, residing at Lebanon, in the county of Wilson and State of Tennessee, have invented certain new and useful Improvements in Cultivators, of which the following is a specification.

This invention relates to cultivators, and it has for its object to provide simple and improved means for mounting and securing the shovel in its operative or working position in such a manner as to enable the said shovel to be adjusted, or placed at various angles in relation to the surface of the ground, to suit the varying circumstances under which work is to be performed.

Further objects of the invention are to simplify and improve the construction and operation of this class of devices.

With these and other ends in view which will readily appear as the nature of the invention is better understood, the same consists in the improved construction and novel arrangement and combination of parts, which will be hereinafter fully described and particularly pointed out in the claims.

In the accompanying drawing has been illustrated a simple and preferred form of the invention; it being, however, understood that no limitation is necessarily made to the precise structural details therein exhibited, but that changes, alterations and modifications within the scope of the invention may be resorted to when desired.

In the drawings—Figure 1 is a side elevation of a cultivator embodying the invention. Fig. 2 is a top plan view of the same. Fig. 3 is a perspective detail view showing one of the shovel carrying shanks, detached. Fig. 4 is a perspective detail view of the shovel carrying shoe. Fig. 5 is a side elevation of one of the shovel carrying shanks showing the shoe and the shovel in position for operation, said shoe and shovel being shown in vertical section.

Corresponding parts in the several figures are denoted by like characters of reference.

In the preferred embodiment of our invention, we employ two shovel carrying shanks 1, 1, which are preferably constructed of metal and of the usual well-known and conventional curved or arcuate shape, the lower ends of said shanks being presented in a forward direction to form the feet $1^a$ upon which the shovel carrying shoes are mounted, as will be presently more fully described. The shanks may be constructed with longitudinal forwardly extended portions 2, having shoulders or offsets 3; the longitudinal portions 2, being provided with apertures $2^a$, for the passage of fastening members, such as bolts $3^a$ whereby the shanks may be secured in position upon a beam 4. In the example selected for illustration, the shanks secured upon the two sides of the beam are offset outwardly in opposite directions, thus causing the feet $1^a$ to be properly separated and spaced apart. Auxiliary shanks 12 have been shown as being suitably mounted upon the rear end of the beam; and the shanks 1, 1, have been illustrated as being equipped with handles 15, adjustably supported by means of braces $16^a$.

The foot $1^a$ of the shank is provided at or near its forward extremity with transverse perforations or apertures $5^a$ and $6^a$, the former of which is for the passage of a pin or bolt 5, upon which the shovel carrying shoe 6 is pivotally mounted. Said shoe may be described as consisting of an approximately ovoidal body, terminating at its lower end in a relatively sharp point 16, and having its upper surface flattened to present an ovate acuminate face 17, which is curved in the direction of its length so as to afford a seat for the correspondingly curved shovel 7, the latter being secured adjustably upon the shoe or holder by a fastening member 8, such as a bolt, for the passage of which the body of the shoe is provided with a longitudinal vertical slot or recess 9. The body of the shoe is provided with rearwardly extending inclined arms 10, 10, each provided with a plurality of transverse perforations 18, for the passage of a fastening member, such as a bolt 19, whereby the shovel carrying shoe is adjustably connected with the foot $1^a$, which is provided with the aperture $6^a$, above referred to, for the passage of the bolt 19. It will be readily seen that the shoe is capable of pivotal movement upon the bolt 5, enabling it to be adjusted to various positions at different angles to the surface of the ground; it being secured in adjusted position by passing the bolt 19 through the apertures 18 in the arms 10, which, after adjusting the shoe, are in registry with the aperture $6^a$.

It will be readily seen from the foregoing description taken in connection with the drawings hereto annexed, that the shovel may be adjusted vertically upon the shoe or holder, such adjustment being limited only by the dimensions of the slot or recess 9; and the shovel may be placed at various angles to the surface of the ground by rocking the shoe or holder upon the pivotal member 5, it being obvious that any desired number of apertures may be provided in the arms 10, and it being likewise evident that said apertures should be arranged in series, concentric to the axis of the pivotal member 5. The peculiar shape of the shovel carrying shoe renders it highly effective in penetrating the soil, its under side being curved, rounded and terminally pointed so that the progress of the device will not be obstructed. This peculiar shape is also very effective in preventing the accumulation of rubbish and debris; the shoe or holder is solid and massive, and it affords a very firm and substantial seat for the shovel. The improved shoe or holder may be used in connection with any ordinary conventional plow foot or cultivator foot, and it will be securely braced and mounted by the arms 10, which engage the opposite sides of the foot. The general construction is simple and inexpensive; the shoe or holder being preferably in the form of an ordinary casting; and it has proved in practice to be thoroughly efficient for the purpose for which it is provided.

Having thus described the invention, what is claimed is:

1. A shovel carrying shoe, consisting of a longitudinally slotted ovoidal body, forwardly tapered to present a relatively sharp point and having its upper surface flattened to present an ovate acuminate seat; said body being provided with rearwardly inclined arms, transversely perforated near the junction of said arms with the body, and near the rearward extremities of said arms.

2. In a cultivator, a shank having a terminal foot, in combination with the shovel carrying shoe consisting of a longitudinally slotted ovoidal body having its upper surface flattened and longitudinally curved to present an ovate acuminate seat, said body being provided with rearwardly inclined arms; a pivotal member extending transversely through said arms and through the cultivator foot; a securing member extending transversely through the arms and through the foot; a shovel seated upon the shoe, and a securing member extending through the shovel and through the longitudinal slot in the body of the shoe.

In testimony whereof we affix our signatures, in presence of two witnesses.

WILLIAM E. TRICE.
ROBERT H. TRICE.

Witnesses:
J. J. DODSON,
SARAH D. FERRELL.